United States Patent [19]
Koitabashi et al.

[11] Patent Number: 5,335,154
[45] Date of Patent: Aug. 2, 1994

[54] OPTICAL AXIS ADJUSTMENT MECHANISM FOR A LIGHT SOURCE

[75] Inventors: Masanobu Koitabashi; Masato Toda; Keiji Handa, all of Hachioji, Japan

[73] Assignee: Olympus Optical Co., Ltd., Tokyo, Japan

[21] Appl. No.: 942,316

[22] Filed: Sep. 8, 1992

[30] Foreign Application Priority Data

Sep. 12, 1991 [JP] Japan .................................. 3-233116

[51] Int. Cl.⁵ .............................................. F21V 29/00
[52] U.S. Cl. ...................................... 362/294; 362/250; 362/285; 362/413
[58] Field of Search ............... 362/282, 284, 287, 289, 362/322, 324, 373, 428, 294, 220, 250, 285, 413

[56] References Cited

U.S. PATENT DOCUMENTS

| | | | |
|---|---|---|---|
| 1,250,249 | 12/1917 | Vaught | 362/284 |
| 1,699,710 | 1/1929 | Pearlman | 362/285 |
| 4,389,700 | 6/1983 | Blaisdell et al. | |
| 4,423,469 | 12/1983 | Zerlaut et al. | 362/285 |
| 4,841,422 | 6/1989 | Groh | 362/294 |
| 4,985,815 | 1/1991 | Endo | 362/373 |
| 5,091,828 | 2/1992 | Jincks et al. | 362/373 |
| 5,219,221 | 6/1993 | Yamaka et al. | 362/294 |

FOREIGN PATENT DOCUMENTS 57-110815  7/1982  Japan .

*Primary Examiner*—Carroll B. Dority
*Attorney, Agent, or Firm*—Armstrong, Westerman, Hattori, McLeland & Naughton

[57] ABSTRACT

A light source comprises a lamp house including a source lamp for emitting illumination light in a certain direction and heat sinks for cooling the source lamp, a base member for holding the lamp house and moving the lamp house to adjust the optical axis of illumination light the source lamp emits, and an optical axis adjustment mechanism operation unit lying outside the lamp house to be manipulated from the side of the lamp house and driving the optical axis adjustment mechanism.

6 Claims, 16 Drawing Sheets

OPTICAL AXIS ADJUSTMENT MECHANISM FOR A LIGHT SOURCE

BACKGROUND OF THE INVENTION

1. Field of the Invention

The present invention relates to a light source, or more particularly, to an optical axis adjustment mechanism for moving a lamp house to adjust an optical axis of illumination light a source lamp emits.

2. Description of the Related Art

In a light source for supplying light to a fiberscope, an optical axis of illumination light to be emitted is adjusted so that light will be supplied in an optimal state to an intended region (back end surface of a light guide for a fiberscope). Specifically, the optical axis of illumination light to be emitted is adjusted to coincide with the intended region, so that the illumination light will be emitted toward the intended region. In general, an art of moving a lamp house and an art of moving an optical block made up of condensers, a diaphragm adjustment mechanism for adjusting an amount of light, and a light guide receptor for a fiberscope are known for adjusting an optical axis of illumination light.

For instance, an art based on a feed screw mechanism has been proposed as the art of moving a lamp house in Japanese Utility Model Unexamined Publication No. 57-110815.

To be more specific, as shown in FIG. 1, a feed screw mechanism 2 made up of a feeder 2a, a coupling 2b for moving the feeder 2a vertically, and a gear 2c for turning the coupling 2b, is placed below a lamp house 1. The gear 2c of the feed screw mechanism 2 is manipulated from vertically to rotate. Thereby, the feeder 2a is moved vertically via the coupling 2b. Then, the lamp house 1 is moved to adjust a optical axis vertically.

When an optical axis is moved vertically or horizontally and thus adjusted, a lamp house should, preferably, be moved while being held horizontal so that the optical axis will not be displaced in a direction other than the moving direction and varied its orientation. However, according to the aforesaid prior art of moving a lamp house, when a feed screw is used, a backlash of the screw causes the lamp house to waver and makes it hard to move the lamp house vertically while keeping it horizontal. Then, use of a large-diameter feed screw is conceived to cope with this problem. However, use of a large-diameter feed screw generally causes parts to become unusable, thereby increasing cost.

When the lamp house is moved vertically to adjust the optical axis, the feed screw mechanism placed below the lamp house must be vertically manipulated. Therefore, the housing of the light source must be uncovered to adjust the optical axis.

On the other hand, according to an art of moving an optical block to adjust an optical axis, as shown in FIGS. 2 and 3, a base member 6 joined with the bottom of an optical block 5 is screwed to a base 8 having a guide axis 7 via springs 9. The screws 10 are loosened to move the base member 6 vertically. Thereby, the optical block 5 is adjusted vertically and secured at an appropriate position by tightening the screws 10.

Even when the optical block is moved to adjust the optical axis, the optical block should preferably be moved while being kept horizontal so that the orientation of the optical axis will not vary. However, according to the foregoing art of moving the optical block to adjust the optical axis, the center of gravity of the optical block and the center of the base member joined with the bottom of the optical block do not lie on the same vertical axis. Therefore, the base member rubs against the contact surfaces on the right and left of the base and the guide axis, causing a jerk. This makes it hard to move the optical block vertically and smoothly while keeping it horizontal.

SUMMARY OF THE INVENTION

An object of the present invention is to provide a light source making it possible to move a lamp house smoothly while preventing an optical axis of illumination light to be emitted from being displaced in an unintended direction, and thus permitting easy adjustment of an optical axis.

Other object of the present invention is to provide a light source making it possible to smoothly moving a lamp house vertically or horizontally while keeping it horizontal, and thus permitting easy adjustment of an optical axis.

The other object of the present invention is to provide a light source permitting adjustment of an optical axis in at least one of vertical, horizontal, and axial directions from the side of a lamp house without a necessity of removing a housing cover from the light source.

The present invention comprises a lamp house having a source lamp for emitting illumination light in a certain direction and heat sinks for cooling the source lamp, a base member holding the lamp house and having an optical axis adjustment mechanism that moves the lamp house to adjust an optical axis of the illumination light the source lamp emits, and an optical axis adjustment mechanism operation unit lying outside the lamp house to be manipulated from the side and driving the optical axis adjustment mechanism.

The other features and advantages of the present invention will be apparent in conjunction with the description below.

BRIEF DESCRIPTION OF THE DRAWINGS

FIG. 4 is a schematic explanatory diagram of a lamp house vertical movement mechanism;

FIG. 5 is an explanatory diagram of component parts of a lamp house vertical movement mechanism;

FIG. 7 is a perspective view of a lamp house movement mechanism;

FIG. 8 shows a back-and-forth longitudinal cross section of the center of FIG. 7;

FIG. 9 is an explanatory diagram showing a cross section of a lamp house movement mechanism;

FIG. 10 is a perspective view of a lamp house movement mechanism;

DETAILED DESCRIPTION OF THE PREFERRED EMBODIMENTS

Figure 1:
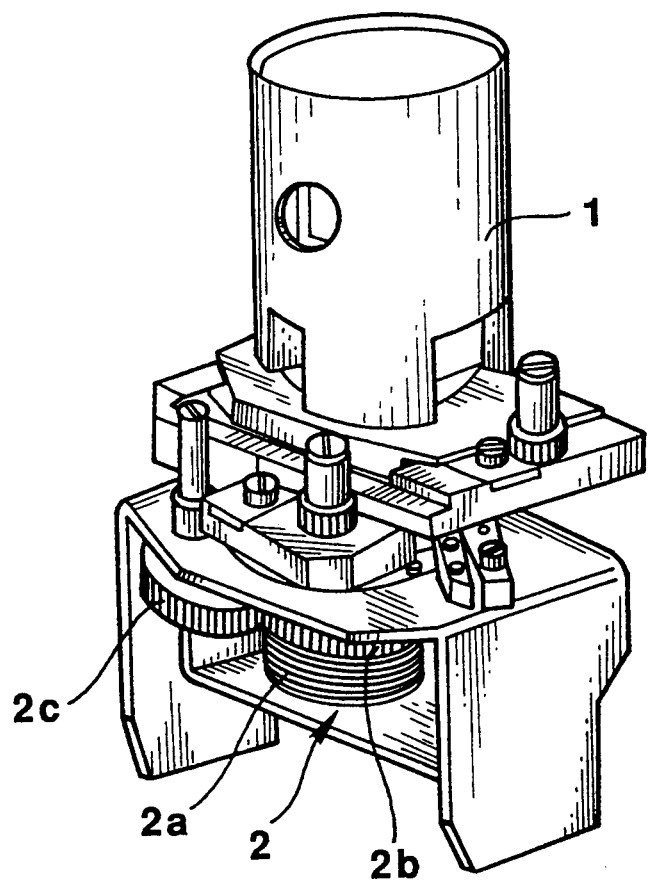
FIG. 1 is an explanatory diagram of a lamp house movement mechanism based on a feed screw mechanism of a prior art.
Figure 2:
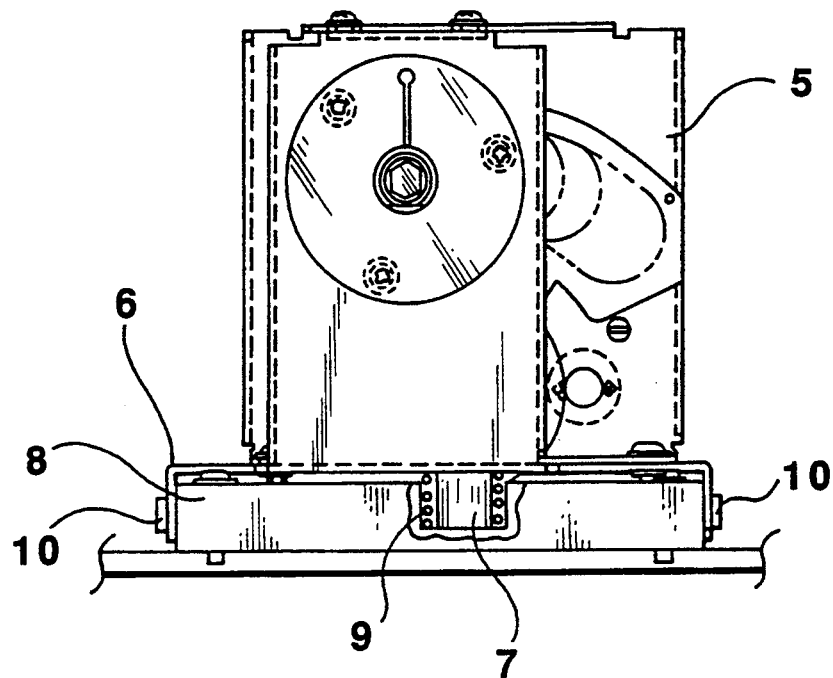
FIG. 2 is an explanatory diagram of an optical block movement mechanism of a prior art.
Figure 3:
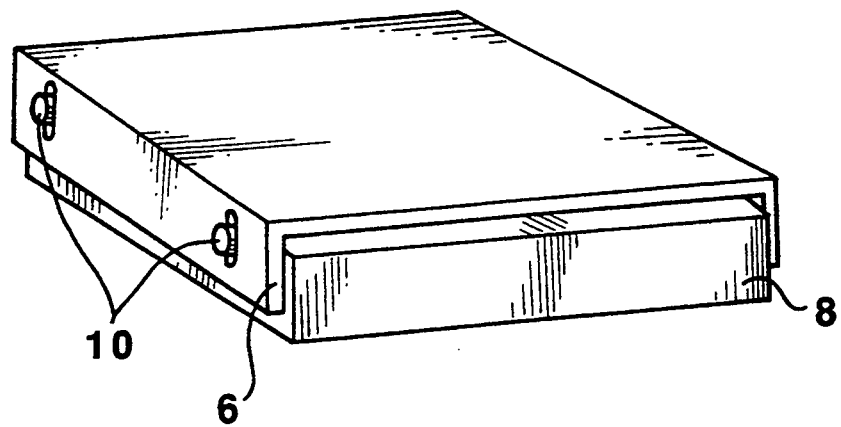
FIG. 3 is an oblique view of a base for an optical block movement mechanism of a prior art.
Figure 4:
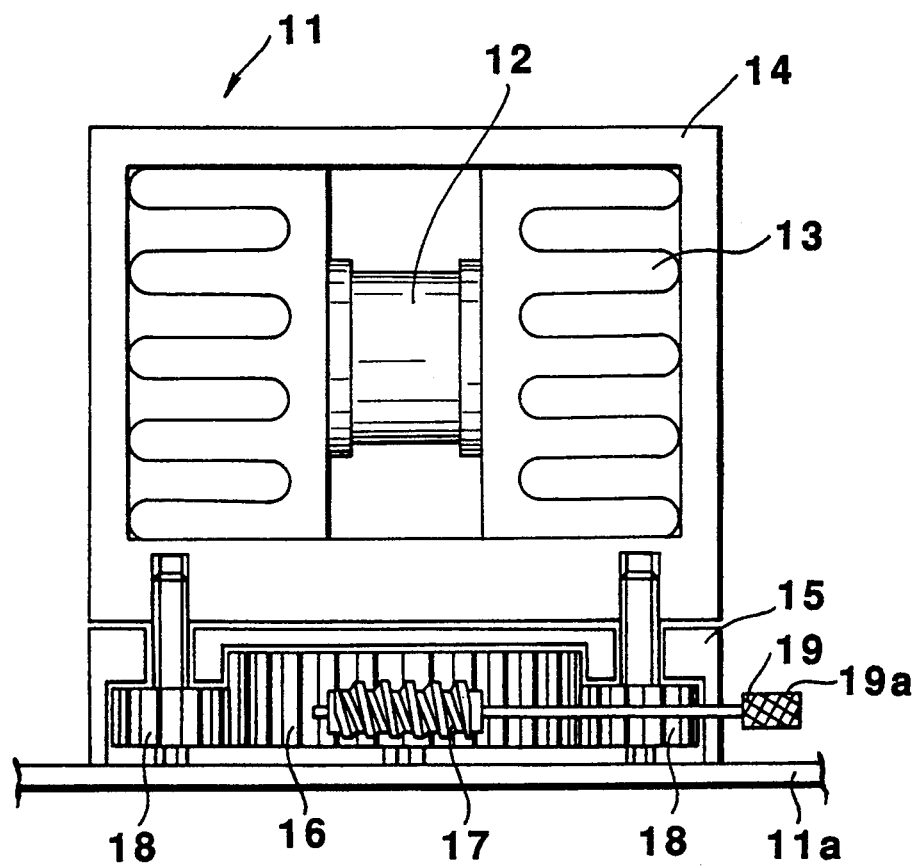
FIGS. 4 and 5 relate to the first embodiment of the present invention.
Figure 5:
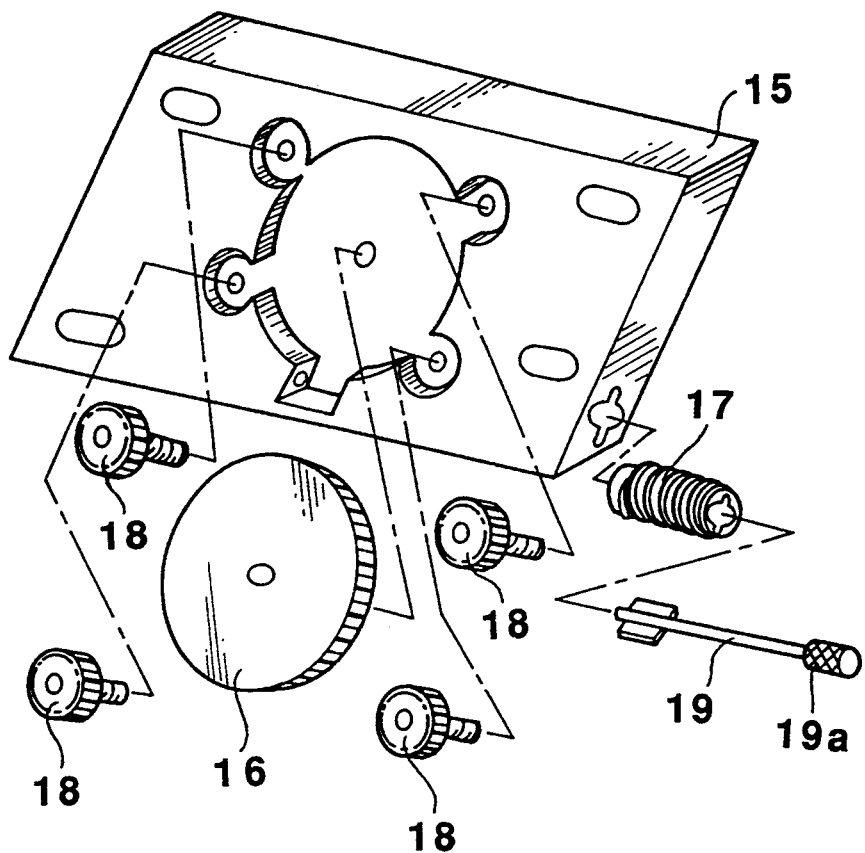

FIGS. 4 and 5 show the first embodiment of the present invention. FIG. 4 is a schematic explanatory diagram of a lamp house vertical movement mechanism. FIG. 5 is an explanatory diagram for component parts of the lamp house vertical movement mechanism.

In FIGS. 4 and 5, a numeral 11 denotes a light source. The light source 11 is connected to a fiberscope which is not shown and provides the fiberscope with light originating from a xenon lamp or other source lamp 12 placed in the light source. The source lamp 12 is held by heat sinks 13 each serving as a heat radiation member and an electrode for the source lamp 12 and encased in a lamp house 14.

When the light source 11 supplies illumination light to a fiberscope, for example, the illumination light is emitted toward the back end surface of a light guide of the fiberscope. At this time, the illumination light must be supplied in an optimal state to the back end surface of the light guide. To achieve this object, the optical axis of the illumination light is adjusted so that the optical axis will align with the center axis of the light guide and come in the center of the incident end surface of the light guide. The light source 11 of this embodiment is provided with an optical axis adjustment mechanism described later.

A base member 15 is placed below the lamp house 14, whose bottom is screwed to a housing 11a of the light source 11. Arranged in the lower part of the base member 15 are a worm wheel 16 serving as a vertical drive, a worm 17 capable of rotating the worm wheel 16, and four feed screws 18 whose heads are formed as spur gears capable of engaging with the worm wheel 16 and rotated simultaneously by the worm wheel 16. The feed screw threads of the four feed screws 18 are projecting from the top of the base member 15 so that they can be coupled with the screw threads threaded on the bottom of the lamp house 14 so that turning of feed screws 18 causes vertical movement of the lamp house 14, thus bearing the lamp house 14 as lamp house holders.

A flag-like side end of an adjustment knob 19 having a knob 19a at the other end lies along the center of the rotation axis of the worm 17 and rests in the worm 17. The knob 19a of the adjustment knob 19 is extending outside the base member 15, which serves as an optical axis adjustment mechanism operation unit to be manipulated from the side of the lamp house 14.

Next, the operation of the embodiment having the aforesaid construction will be described.

To adjust an optical axis vertically of a light source, first, a knob 19a of an adjustment knob 19 extending from the side of a base member 15, must be turned.

Then, the torque is transmitted to a worm 17 from a flag-like end of the adjustment knob 19. Then, the worm 17 turns. With the turn of the worm 17, a worm wheel 16 rotates. Then, four feed screws 18 engaging the worm wheel 16 rotate simultaneously.

As a result, a lamp house 14 coupled with the four feed screws 18 moves vertically and smoothly while remaining horizontal.

Thus, when the adjustment knob 19 is turned, the lamp house 14 is smoothly moved vertically and perpendicularly to the optical axis while being kept horizontal. Thus, the optical axis can be adjusted vertically from the side of the lamp house effortlessly without a necessity of removing a housing cover from the light source.

In this embodiment, four feed screws are used to move a lamp house vertically. The number of feed screws is not limited to four but any multiple number of feed screws may be used to move the lamp house vertically.

A worm wheel in this embodiment may be formed to have a two-layer structure made up of a worm gear structure and a spur gear structure. This construction makes it easy to design teeth of gears.

Figure 6:
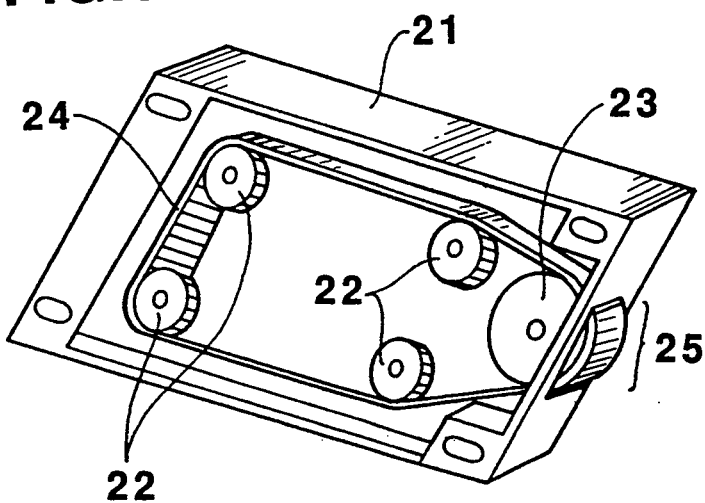
FIG. 6 is an explanatory diagram of component parts of a lamp house vertical movement mechanism relating to the second embodiment of the present invention.

FIG. 6 is an explanatory diagram for component parts of a lamp house vertical movement mechanism relating to the second embodiment of the present invention.

The second embodiment has almost the same construction as the first embodiment. However, a worm gear mechanism is employed to rotate multiple feed screws simultaneously in the first embodiment, while a timing belt mechanism is employed in the second embodiment.

Component parts identical to those for the first embodiment will not be described.

In FIG. 6, a numeral 21 denotes a base member placed below a lamp house 14 having the same structure as that in the first embodiment. Arranged in the base member 21 are four feed screws 22 whose heads are formed as timing pulleys, a timing pulley 23 slightly projecting from the side of the base member 21, and a timing belt 24 laid on the four feed screws 22 and timing pulley 23. Part of the timing pulley 23 and timing belt 24 projecting from the side of the base member 21 forms an optical axis adjustment operation unit 25 in the second embodiment.

To adjust the optical axis vertically of a light source, first, the timing pulley 23 and timing belt 24 projecting from the side of the base member 15 below the lamp house 14 must be turned.

Then, the torque is transmitted to the four feed screws 22 via the timing belt 24. Thus, the four feed screws 22 rotate simultaneously. As a result, the lamp house 14 coupled with the four feed screws 22 moves smoothly and vertically while remaining horizontal.

In this embodiment, four feed screws are employed to move a lamp house vertically. The number of feed screws is not limited to four but any multiple number of feed screws may be employed to move the lamp house vertically.

The other components and the operation of this embodiment are identical to those of the first embodiment. The description will, therefore, be omitted.

Figure 7:
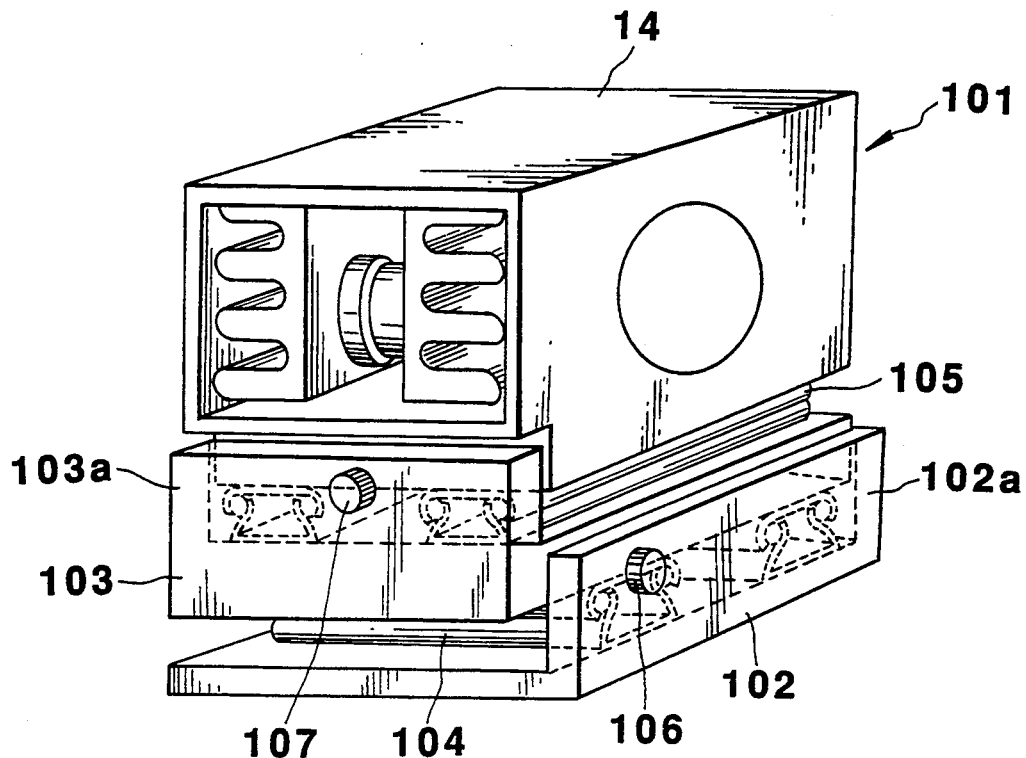
FIGS. 7 and 8 relate to the third embodiment of the present invention.
Figure 8:
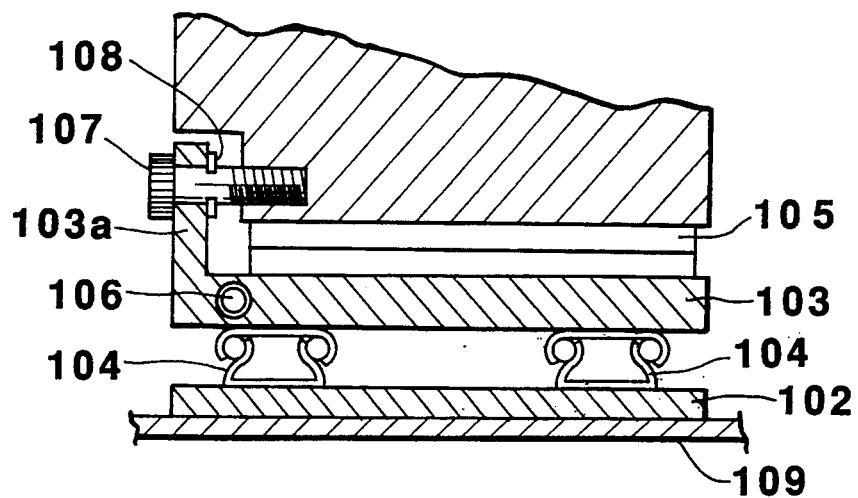

FIGS. 7 and 8 show the third embodiment of the present invention. FIG. 7 is a perspective view of a lamp house movement mechanism. FIG. 8 shows a back-and-forth longitudinal cross section of the center of FIG. 7.

A light source 101 of the third embodiment has a base member made up of a lower base 102 and an upper base 103 that are L-shaped with their ends bent up. A lamp house 14 is mounted on the upper base 103. The lower base 102 is screwed to a housing 109 of the light source.

Two guide rails 104 serving as horizontal movement holders are laid on the lower base 102 so that they will be in parallel with the optical axis of the lamp house 14. The upper base 103 is fitted on the guide rails 104 so that it can move along the optical axis of the lamp house 14. On the top of the upper base 103, two guide rails 105 serving as horizontal movement holders are laid perpendicularly to the guide rails 104 on the lower base 102. The lamp house 14 is fitted on the guide rails 105 so that it can move horizontally and perpendicularly to the optical axis.

To a rising 102a of the lower base 102, a lower feed screw 106 whose head is knurled as an antislipping precaution and serves as an adjustment knob is attached in parallel with the guide rails 104. The distal portion of the screw thread of the lower feed screw 106 is engaged with a male screw threaded on the side of the upper base 103. Also to a rising 103a of the upper base 103, an upper feed screw 107 whose head is knurled as an antislipping precaution and serves as an adjustment knob is attached in parallel with the guide rails 105. The distal portion of the screw thread of the lower feed screw 107 is engaged with the male screw threaded on the side of the lamp house 14. The lower feed screw 106 and upper feed screw 107 are engaged with the sides of the upper base 103 and lamp house 14 respectively. The lower feed screw 106 and upper feed screw 107 are, as shown in FIG. 8, secured to the rising 102a of the lower base and the rising 103a of the upper base respectively using E rings 108, so that the lower feed screw 106 and upper feed screw 107 will not come off but rotate freely.

When the lower feed screw 106 turns, the upper base 103 engaged with the lower feed screw 106 moves along the optical axis on the guide rails 104. When the upper feed screw 107 turns, the lamp house 14 engaged with the upper feed screw 107 moves horizontally and perpendicularly to the optical axis on the guide rails 105. That is to say, when the adjustment knob of the head of the upper or lower feed screw 106 or 107 is turned, the lamp house 14 is moved in parallel with or horizontally and perpendicularly to the optical axis.

To adjust the optical axis of the light source 101, first, the adjustment knob of the head of the lower feed screw 106 attached to the lower base 102 must be turned. Then, the screw thread of the lower feed screw 106 turns, and the upper base 103 engaged with the screw thread and the lamp house 14 on the upper base 103 move horizontally along the optical axis on the guide rails 104 while remaining horizontal. When the adjustment knob of the head of the upper feed screw 107 attached to the upper base 103 is turned, the screw thread of the upper feed screw 107 turns. Then, the lamp house 14 engaged with the screw thread moves horizontally and perpendicularly to the optical axis on the guide rails 105 while remaining horizontal.

Thus, when the upper or lower feed screw 106 or 107 is turned, the lamp house 14 is moved in parallel with or horizontally and perpendicularly to the optical axis while being kept horizontal. Thus, the optical axis can be adjusted horizontally from the side of the lamp house effortlessly without a necessity of removing a housing cover from the light source.

Figure 9:
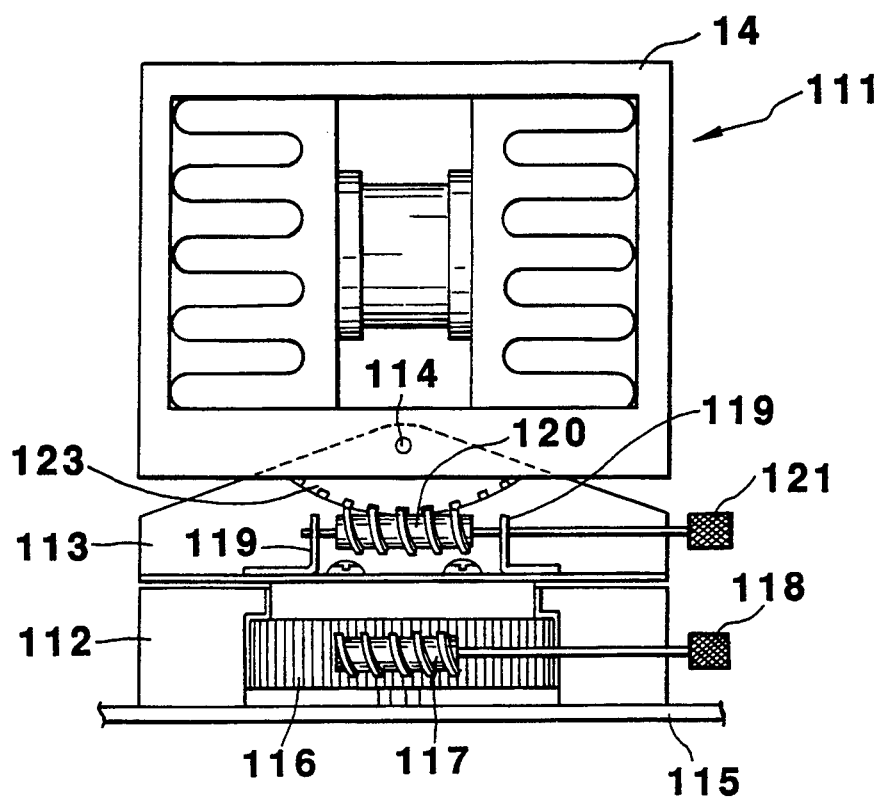
FIGS. 9 and 10 relate to the fourth embodiment of the present invention.
Figure 10:
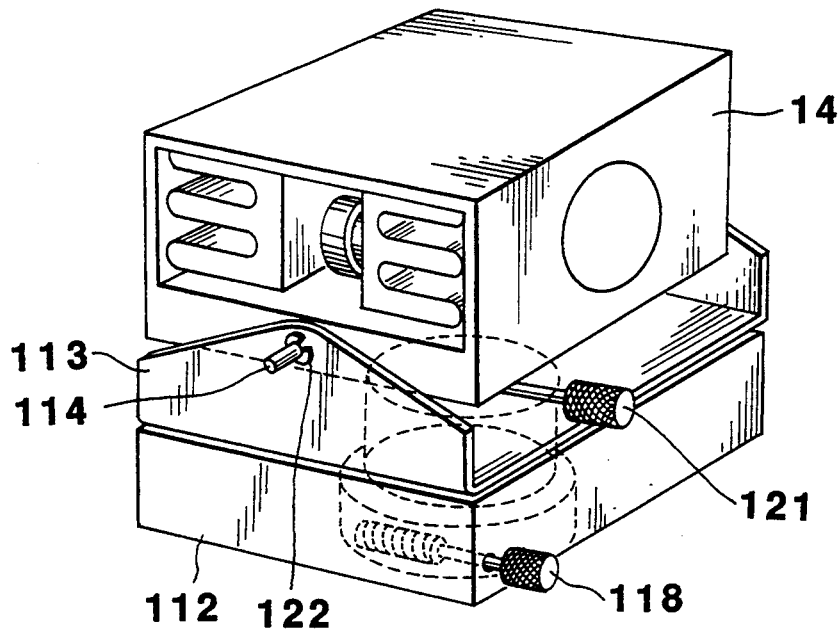

FIGS. 9 and 10 show the fourth embodiment of the present invention. FIG. 9 is an explanatory diagram showing a cross section of a lamp house movement mechanism. FIG. 10 is a perspective view of the lamp house movement mechanism.

In a light source 111 of the fourth embodiment, a bracket 113 is mounted on a base member 112 so that it can turn with the vertical axis as a center, and a lamp house 14 is mounted on a support axis 114 of the bracket 113 to turn freely. The base member 112 is screwed to a housing 115 of the light source.

Arranged in the base member 112 are a worm wheel 116, and a lower worm 17 capable of rotating the worm wheel 116. The bracket 113 is screwed to the top of the worm wheel 116, and rotated together with the worm wheel 116. Similarly to the first embodiment, a lower adjustment knob 118 having a flag-like end is attached. The flag-like end of the lower adjustment knob 118 lies through the center of the rotation axis of the lower worm 117 and engages with the lower worm 117. The lower adjustment knob 118 is extending outside of the base member 112 so that it can be manipulated from the side of the lamp house 14.

Two worm holding members, 119 are welded to the bottom of the bracket 113, bearing the rotation axis of an upper worm 120 and an upper adjustment knob 121. The upper adjustment knob 121 has, similarly to the lower adjustment knob 118, a flag-like end which lies along the center of the rotation axis of the upper worm 120 and rests in the upper worm 120, and extends outside of the bracket 113 so that it can be manipulated from the side of the lamp house 14. A support axis 114 is attached to the upper part of the bracket 113 and running through the bracket 113 and lamp house 14. The ends of the support axis 114 are secured to the bracket 113 with E rings 122 so that they will not come off.

An upper gear 123 is fixed to the bottom of the lamp house 14 held by the support axis 114 so that it will rotate with the support axis 114 as a center. The upper gear 123 is engaged with the upper worm 120. Specifically, when the upper worm 120 is turned by manipulating the upper adjustment knob 121, the upper gear 123 rotates with the support axis 114 lying horizontally as a center. Thereby, the lamp house 14 turns.

To adjust the optical axis of the light source 111, first, the lower adjustment knob 118 extending from the side of the base member 112 must be turned. Then, the torque is transmitted to the lower worm 117. Then, the lower worm 117 turns to rotate the worm wheel 116. Thereby, the bracket 113 coupled with the worm wheel 116 and the lamp house 14 mounted on the bracket 113 turns with an axis vertical and perpendicular to the optical axis as a center. When the upper adjustment knob 121 is turned, the upper worm 120 fitted on the upper adjustment knob 121 turns to rotate the upper gear 123 engaged with the upper worm 120. Thereby, the lamp house 14 to which the upper gear 123 is fixed turns as the support axis 114 or an axis horizontal and perpendicular to the optical axis as a center.

Thus, when the upper or lower adjustment knob 118 or 121 is turned, the lamp house 14 turns with an axis vertical and perpendicular to or horizontal and perpendicular to the optical axis as a center. Thus, the orientation of the optical axis can be adjusted effortlessly from the side of the lamp house.

Figure 11:
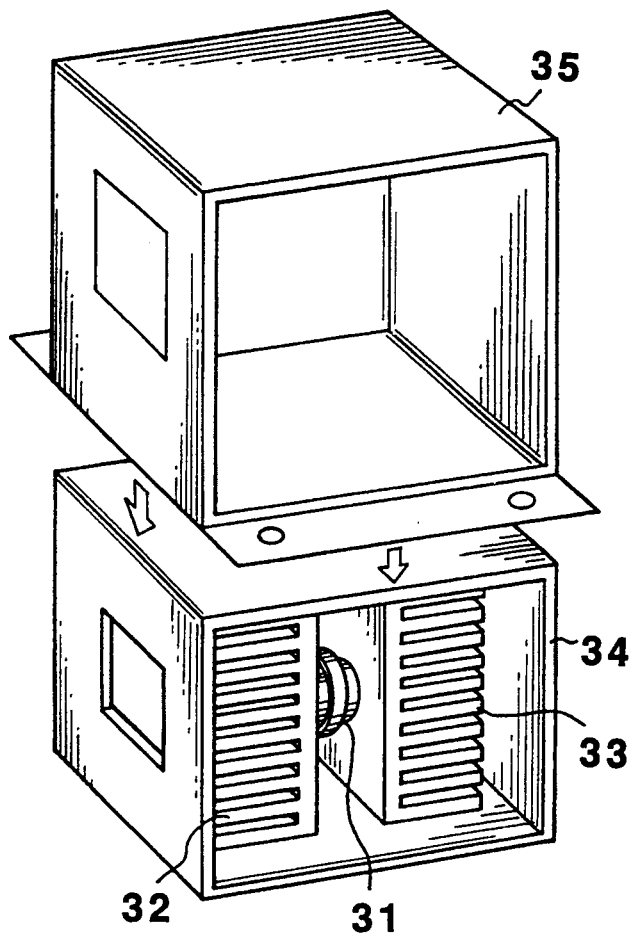
FIG. 11 is an explanatory diagram showing a structure of a lamp house and a shield, case inside a light source.

As shown in FIG. 11, in a light source, a source lamp 31 is fixed to a minus heat sink 32 and a plus heat sink 33 with low electric resistance and high thermal conductivity. The source lamp assembly is encased in a lamp house 34 made of an insulating material. The minus heat sink 32 and plus heat sink 33 are locked in the lamp house 34. The lamp house 34 is encased in a shield case 35 made of a conducting material. One side of each of the lamp house 34 and shield case 35 is open. Each of the lamp house 34 and shield case 35 has an opening in an area coincident with an optical path of light emitted from the source lamp 31.

Figure 12:
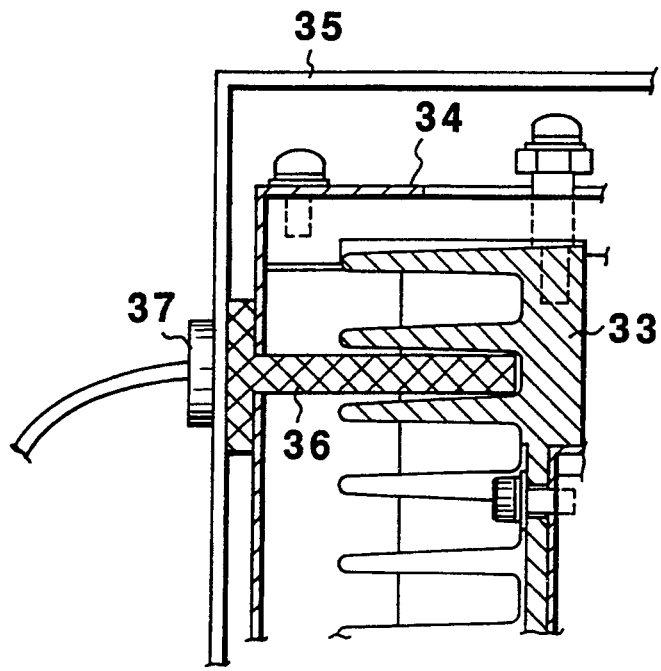
FIG. 12 is an enlarged view of a temperature switch of a plus heat sink.

As shown in FIG. 12, a heat transfer bar 36 made of an insulating material with high thermal conductivity (for example, a ceramic) is placed between radiation fins of the plus heat sink 33 on the opposite side of the source lamp 31. The heat transfer bar 36 passes through the opening of the lamp house 34 and comes into contact with the inner surface of the shield case 35.

A temperature switch 37 is facing the heat transfer bar 36 with the shield case 35 between.

When electric power is supplied to the source lamp 31, heat is transmitted to the minus heat sink 32 and plus heat sink 33, and thus radiated. On the other hand, the heat sinks 32 and 33, which also serve as electrodes for lighting, are isolated from a light source housing (not shown) encased in the lamp house 34 made of an insulating material for protection against electrical hazard.

When the source lamp 31 lights, it generates electric noise which adversely affects other electric parts in the light source. Therefore, the shield case 35 conducts electricity to the light source housing (not shown) to suppress release of electric noise.

For checking the heating state of the source lamp 31, the temperature of the source lamp 31 is transmitted to the temperature switch 37 via the plus heat sink 33, heat transfer bar 36, and shield case 35, then measured. The heat transfer bar 36 is made of an insulating material and a signal is sent via the shield case 35. Therefore, electric noise induced in the source lamp 31 is not transmitted to the circuit of the temperature switch 37.

Next, a structure of a lamp house in a light source will be described.

Figure 13:
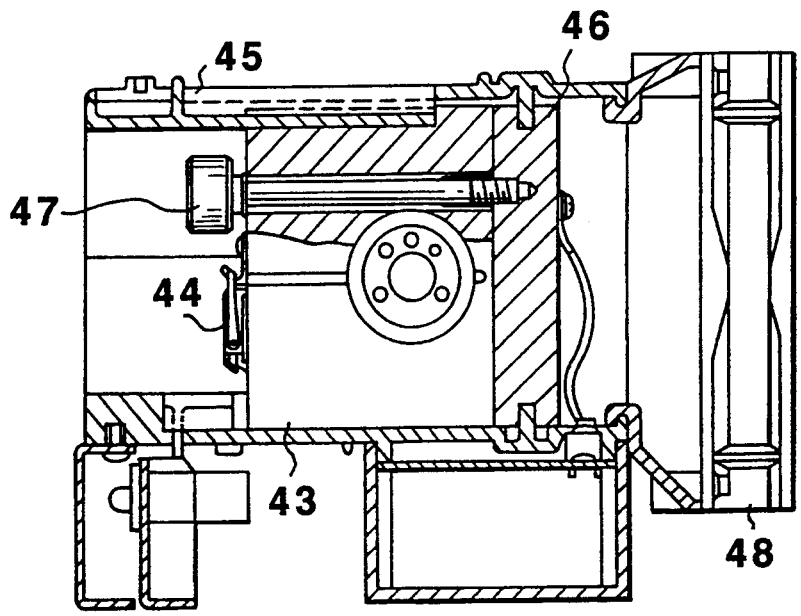
FIG. 13 is an explanatory diagram showing a structure of a lamp house according to a prior art.
Figure 14:
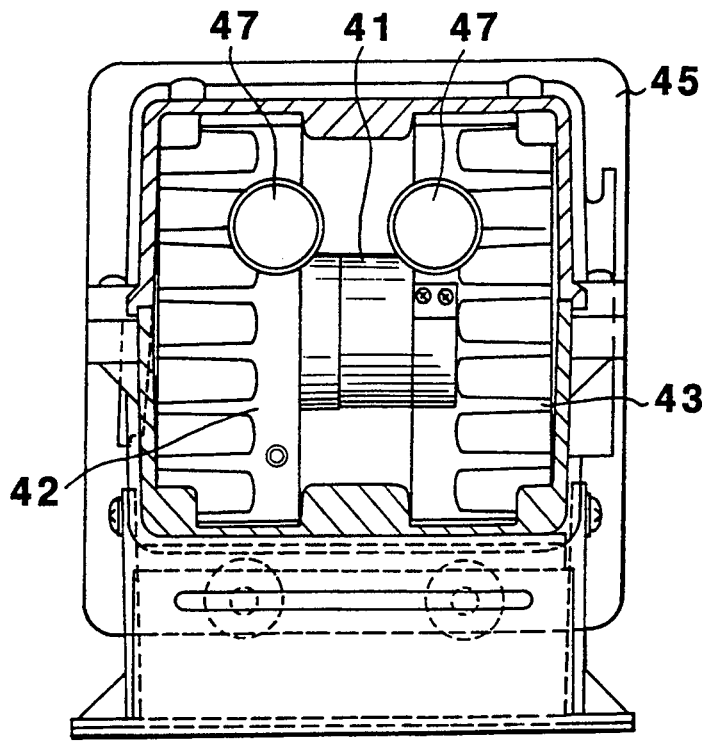
FIG. 14 is an explanatory diagram showing a structure of a lamp house according to a prior art.

FIGS. 13 and 14 show a structure of a conventional lamp house and a lamp holding mechanism. A lamp 41 is secured to an anode heat sink 42 with three screws. A cathode heat sink 43 has a slot leading to the center of a lamp mounting hole. The lamp 41 is fitted to the lamp mounting hole and secured with a snap 44 applied to one end of the lamp 41. Then, the lamp assembly is slided into a lamp house 45 which is designed to be divided up and down, then secured to an electrode heat sink 46 locked in the lamp house 45 using fixing screws 47.

Figure 15:
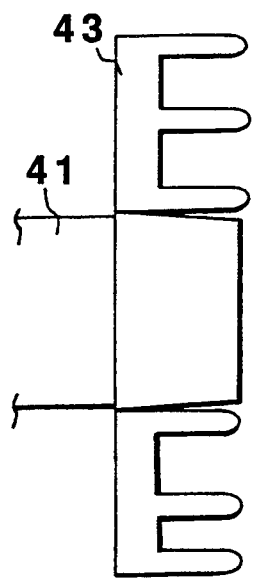
FIG. 15 is an explanatory diagram showing a contact region between a cathode heat sink and a lamp according to a prior art.

In the foregoing conventional structure, as shown in FIG. 15, the lamp 41 tends to taper toward the cathode. Therefore, contact between the cathode heat sink 43 and lamp 41 is so poor to deteriorate heat transfer efficiency. In this kind of conventional lamp house 45, the anode heat sink 42 and cathode heat sink 43, which hold the lamp mounted on the electrode heat sink 46, are secured with the fixing screws 47. This simplifies replacement of the lamp. However, the presence of the electrode heat sink 46 is disadvantageous to realization of a compact light source. Furthermore, the contact between the lamp 41 and the cathode heat sink 43 is poor to deteriorate heat transfer efficiency. Therefore, to cool the lamp 41 completely, the cathode heat sink 43 must be increased in size and a larger-capacity cooling fan 48 must be employed. This also poses as a factor of discouraging realization of a compact light source.

Figure 16:
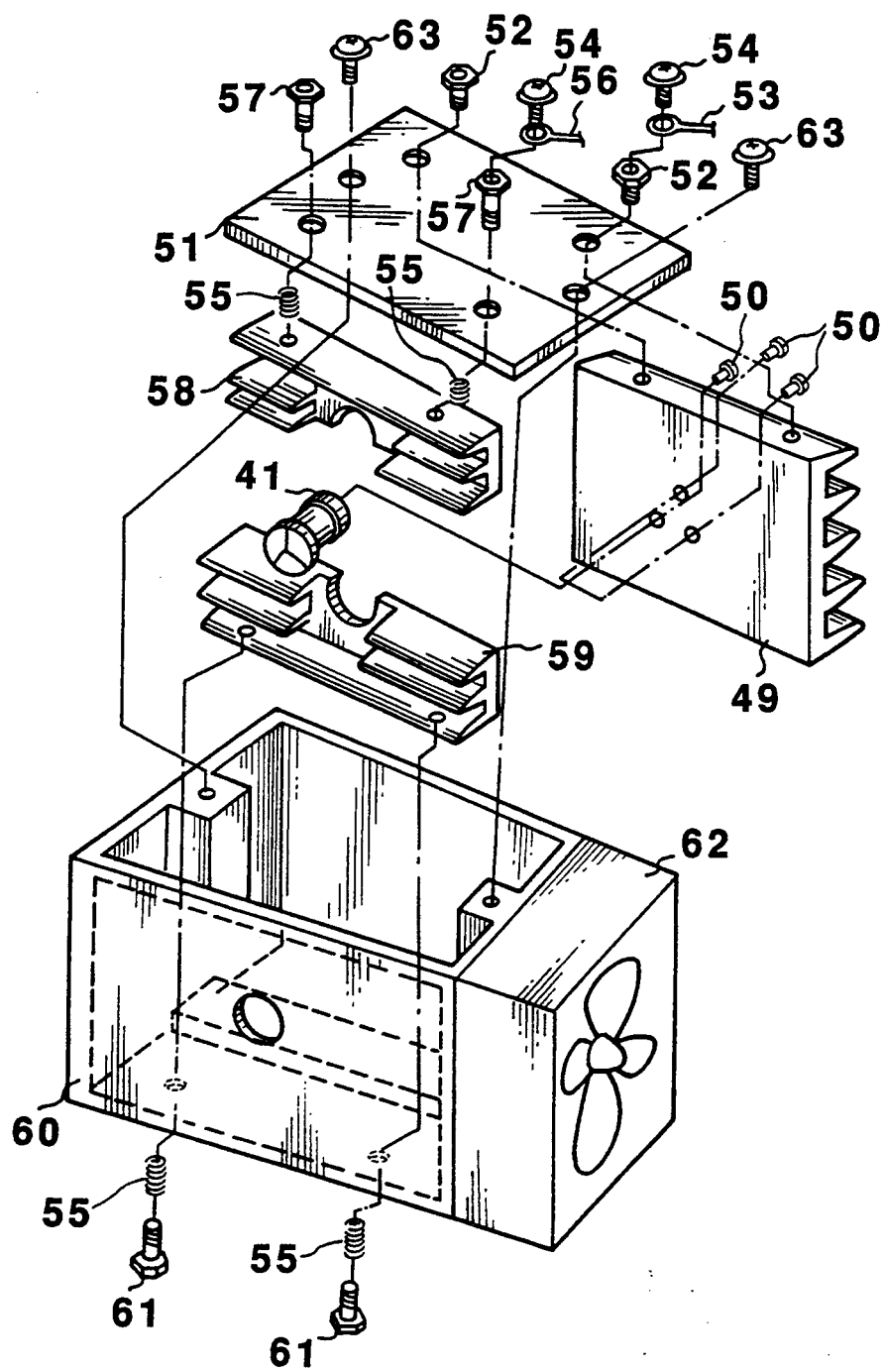
FIG. 16 is an explanatory diagram for assembly of component parts of a lamp house of an innovated example.
Figure 17:
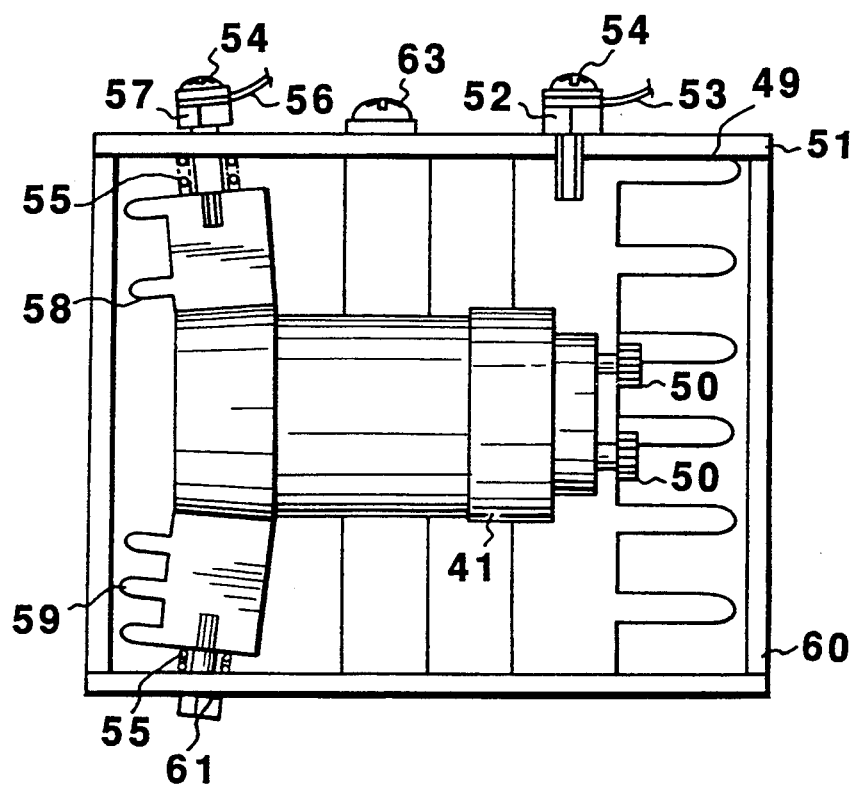
FIG. 17 is a schematic explanatory diagram of a structure of a lamp house of an innovated example.

To overcome these drawbacks, the present invention adopts a structure shown in FIGS. 16 and 17 for a lamp house for a light source.

In FIGS. 16 and 17, a numeral 41 denotes a high-intensity xenon lamp or other lamp. Metal shafts 52 each having a hexagonal head that is female-threaded to secure an anode electrode cord 53 with a screw 54 and a distal portion that is thinner than the hexagonal head and male-threaded are inserted into anode holes on an upper cover 51 of a lamp house to secure an anode heat sink 49 to which the lamp is fixed by attaching lamp setscrews to screw threads on an anode end of the lamp 41.

The anode holes on the upper cover 51 of the lamp house serve as positioning holes for the anode heat sink 49; one of the holes has almost the same diameter as that the outer diameter of a mail screw of one metal shape 52, and the other is an elongated hole whose width is almost the same as the outer diameter of a mail screw of the other metal shape 52.

In the cathode of the lamp 41, metal shafts 57 each having a hexagonal head that is female-threaded to secure a cathode electrode cord with a screw 54, a middle cylindrical portion, and a thinner distal portion threaded as a male screw are inserted into the upper cover 51 of the lamp house via coil springs 55 to secure an upper cathode heat sink 58.

Each of the cathode holes on the upper cover 51 of the lamp house is considerably larger than the outer diameter of the middle cylindrical portion of each metal shaft 57. Therefore, the upper cathode heat sink 58 can move vertically and laterally by the backlash of each hole.

The upper cathode heat sink 58 has a semicircular notch in its center so that the upper cathode of the lamp 41 can be pushed into it.

A lower cathode heat sink 59 is secured to the bottom of a lamp house 60 via coil springs 55 with metal shafts 61 each having a hexagonal head, a middle cylindrical portion, and a thinner distal portion that is male-threaded.

Each of the holes on the bottom of the lamp house is considerably larger than the outer diameter of the middle cylindrical portion of each of the metal shafts 61. Therefore, the lower cathode heat sink 59 can move vertically and laterally by the backlash of each hole.

The lower cathode heat sink 59 has a semicircular notch in its center so that the lower cathode of the lamp 41 can be pushed into it.

A fan 62 is secured to the lamp house 60 with four setscrews which are not shown.

The upper cover assembly of the lamp house is secured to the lamp house body assembly with screws 63.

Thereby, the lamp 41 is caught via coil springs 55 between the upper cathode heat sink 58 and lower cathode heat sink 59, so that it can move vertically and laterally. This tolerates inclination or dimensional variations of the cathode of the lamp 41.

Figure 18:
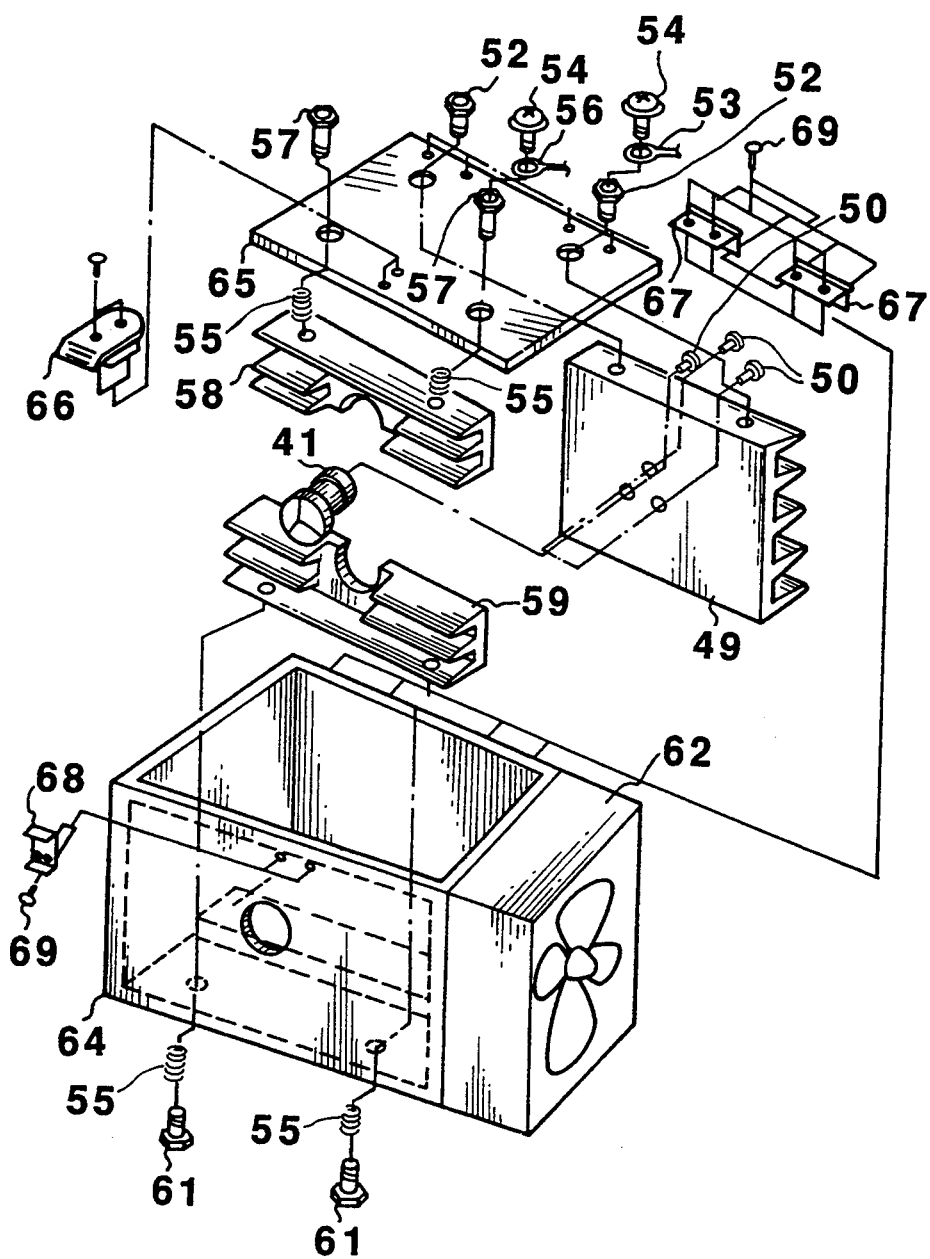
FIG. 18 is an explanatory diagram for assembly of component parts of a lamp house of other example.
Figure 19:
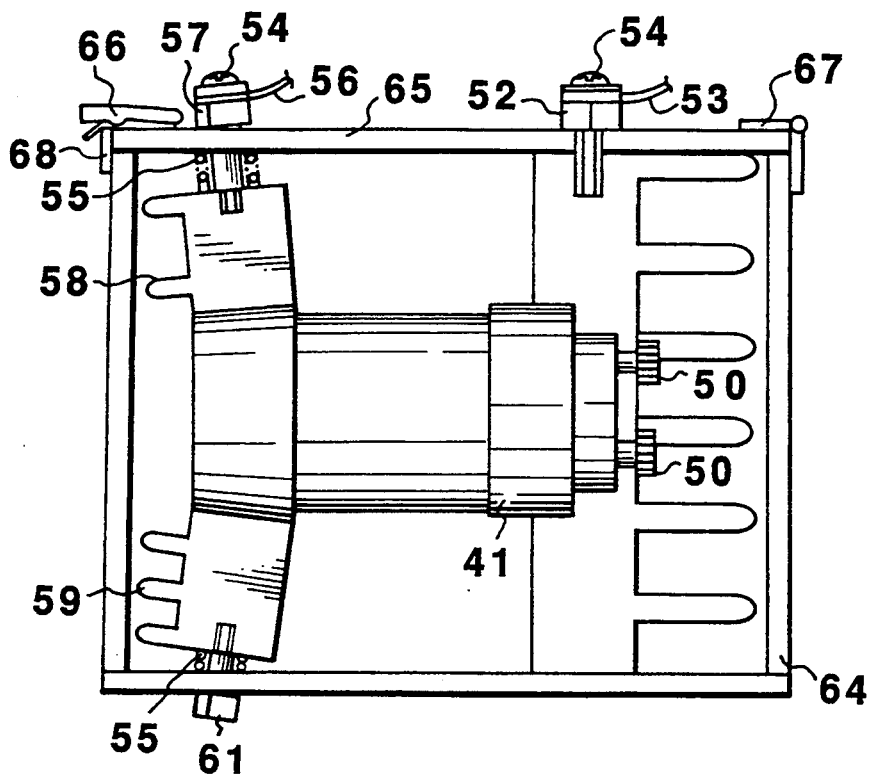
FIG. 19 is a schematic explanatory diagram of a structure of a lamp house of FIG. 18.
Figure 20:
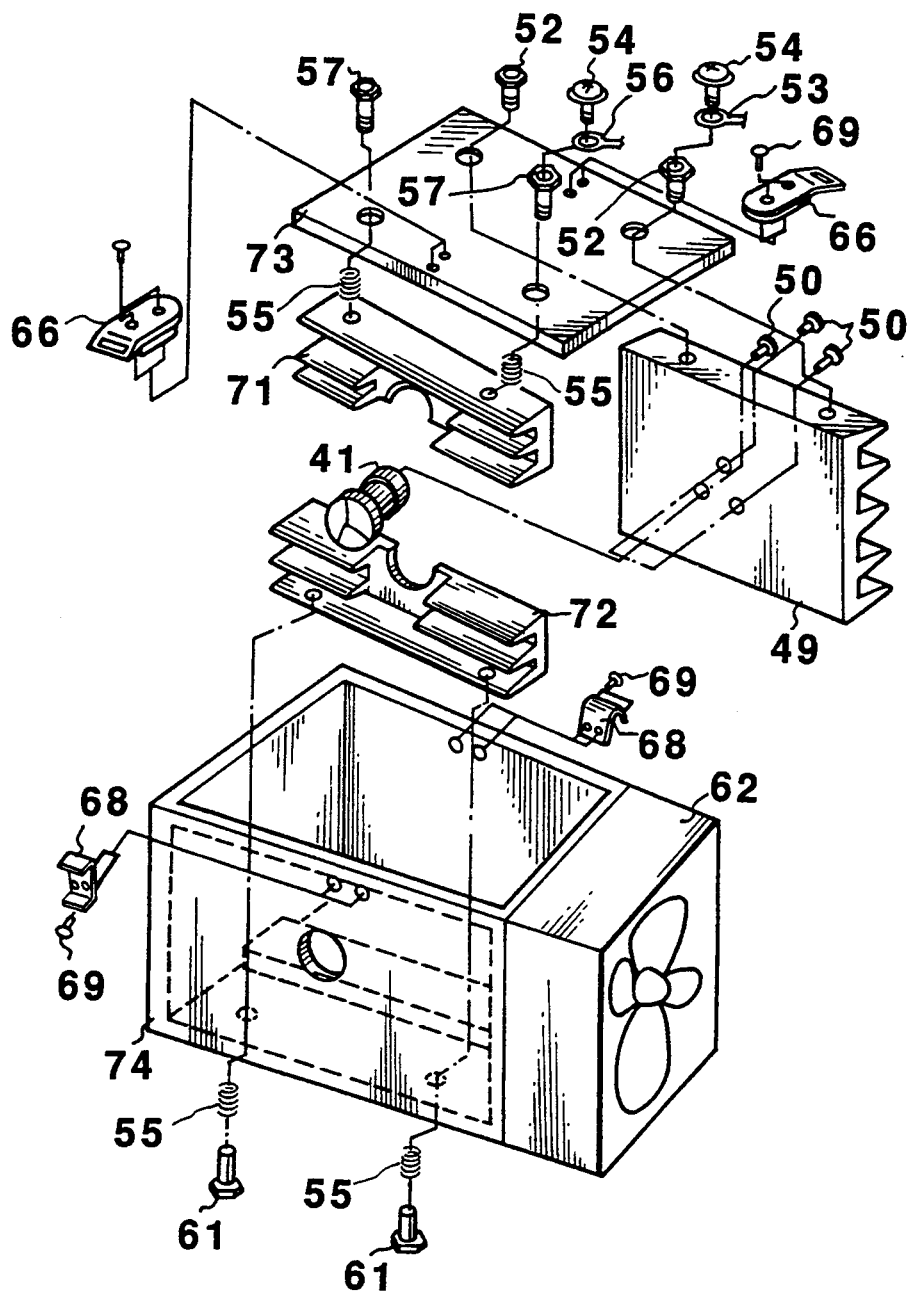
FIG. 20 is an explanatory diagram for assembly of component parts of a lamp house of other example different from FIG. 16.
Figure 21:
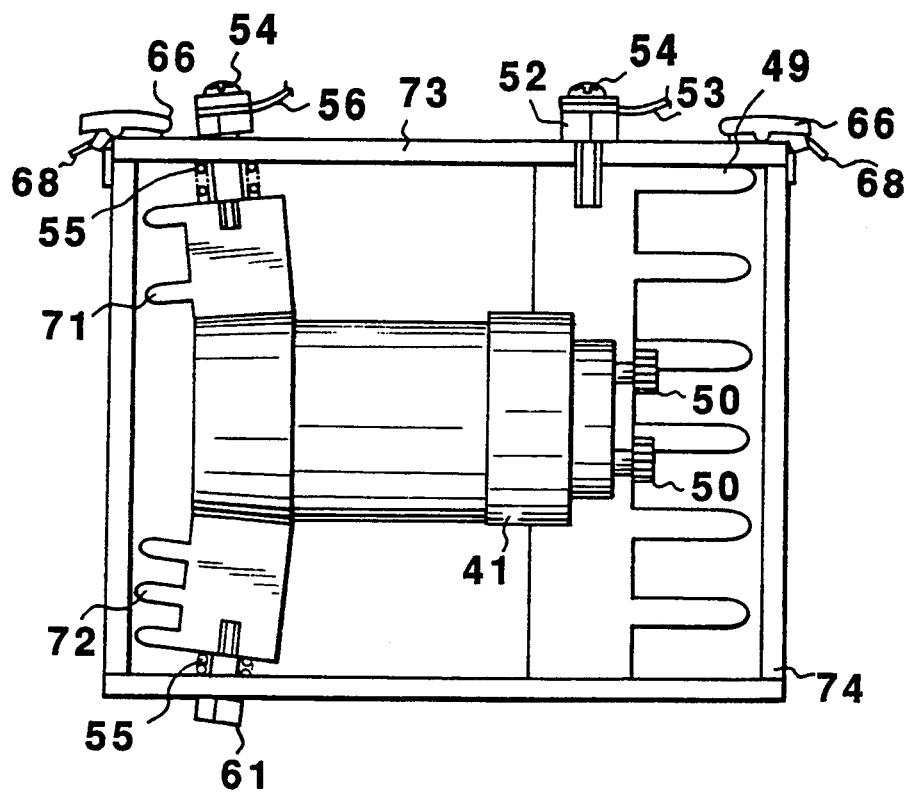
FIG. 21 is a schematic explanatory diagram of a structure of a lamp house of FIG. 20.

Next, other example of a structure of a lamp house for a light source will be described in conjunction with FIGS. 18 and 19.

Component parts identical to those of the aforesaid example are assigned the same numerals. Differences alone will be described.

The cathode of the lamp 41 is locked in the lamp house body assembly 64 by fixing a snap clamp 68 with a setscrew 69. The anode of the lamp 41 is locked in the lamp house body 64 by fixing hinges 67 joined with the upper cover assembly 65 of the lamp house together with the lamp house body 64 and lamp house upper cover 65 using setscrews 69.

A snap 66 is fixed to the lamp house upper cover 65 using setscrews which are not shown. The lamp house upper cover assembly 65 is slided on the lamp house body 64 with the hinges as a rotation center, then the snap 66 is clamped by a snap clamp 63.

Thereby, the lamp 41 is caught via coil springs 55 between an upper cathode heat sink 58 and a lower cathode heat sink 59 so that the lamp 41 can move vertically and laterally. This tolerates inclination or dimensional variations of the cathode of the lamp 41.

Next, the other example of a structure of a lamp house for a light source will be described in conjunction with FIGS. 20 to 23.

Component parts identical to those of the aforesaid example will be assigned the same numerals. Differences alone will be described.

Snap clamps 68 are fixed with setscrews 69 to lock the cathode and anode of a lamp 41 in a lamp house body assembly 74. Snaps 66 are fixed to a lamp house upper cover 73 using setscrews which are not shown, thus securing the cathode and anode of the lamp 41. The lamp house upper cover assembly 73 is secured to the lamp house body 74 by clamping the snaps 66 with snap clamps 68 attached to the lamp house body 74.

Thereby, the lamp 41 is caught via coil springs 55 between an upper cathode heat sink 71 and a lower cathode heat sink 72 so that the lamp 41 can move vertically and laterally. This tolerates inclination or dimensional variations of the cathode of the lamp 41.

Figure 22:
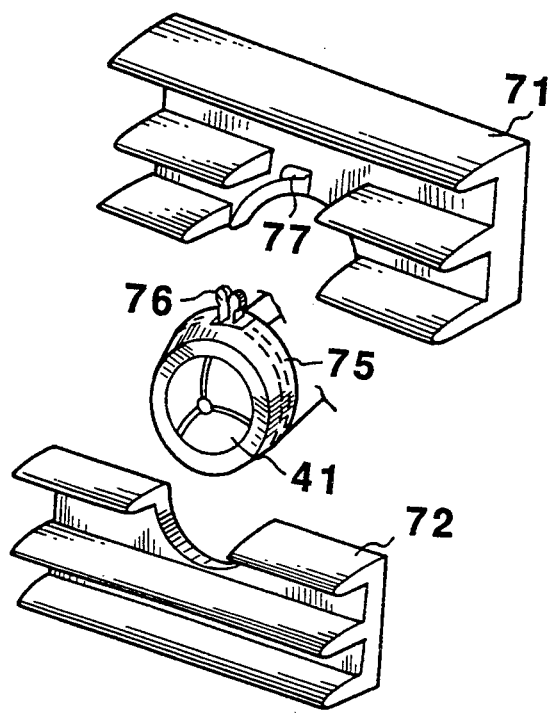
FIG. 22 is an explanatory diagram for explaining how to join a lamp of FIG. 20 with a cathode heat sink.
Figure 23:
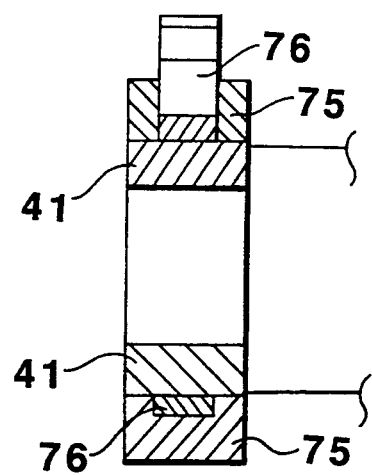
FIG. 23 is a longitudinal, cross-sectional diagram for explaining how to join a lamp of FIG. 20 with a cathode heat sink.

A cathode electrode plate 76 is curved along its circumference and has its ends bent outward in the form of a letter Ω. The outer circumference of the cathode electrode plate 76 made of spring phosphor bronze or other elastic member is covered with an elastic rubber member 75 made of a silicon rubber or other material with excellent thermal conductivity. The elastic rubber member 75 has a notch along the center of the inner circumference. The cathode electrode plate 76 is fitted in the notch of the elastic rubber member 75. The member assembly is wound around the circumference of the lamp 41 in which the lamp 41 is joined with the cathode heat sinks 71 and 72, as shown in FIGS. 22 and 23. Thus, the inner circumferences of the cathode electrode plate 76 and elastic rubber member 75 are in contact with the lamp 41. The outer circumference of the elastic rubber member 75 is in contact with the upper cathode heat sink 71 and the lower cathode heat sink 72, and thus transfers heat to the upper cathode heat sink 71 and the lower cathode heat sink 72. Then, a notch 77 of the upper cathode heat sink 71 comes into contact with the Ω-shaped bent of the cathode electrode plate 76 to supply power to the lamp 41.

This overcomes poor serviceability and inconvenience in assembly of conventional heat sinks, and tolerates dimensional variations of the cathode of a lamp.

As described so far, when a structure of a lamp house for a light source is innovated, heat sinks and a lamp are brought into contact optimally for more efficient heat transfer. Eventually, heat sinks can be designed compactly. Furthermore, since an electrode heat sink is eliminated, compactness of the heat sinks is further facilitated and a lamp house is designed much more compactly than a conventional lamp house. Individual parts are made smaller. Consequently, the volume occupied by parts is reduced to realize a lightweight lamp house.

In the present invention, it will be apparent that a wide range of embodiments can be formed according to the present invention without departing from the spirit and scope of the invention. This invention will be limited to appended claims but not restricted to any particular embodiments.

What is claimed is:

1. A light source comprising:
 a lamp house including a source lamp for emitting illumination light in a certain direction and heat sinks for cooling the source lamp;
 a base member holding said lamp house and having an optical axis adjustment mechanism for non-pivotally moving said lamp house to adjust an optical axis of illumination light said source lamp emits;
 wherein the optical axis adjustment mechanism mounted on said base member includes a plurality of holders for holding the bottom of said lamp house, and a vertical axis drive means for driving said plurality of holders by the same quantity of drive and thus moving said lamp house along said vertical axis while keeping it in a horizontal attitude.

2. A light source according to claim 1 wherein the optical axis adjustment mechanism mounted on said base member includes a plurality of screws attached vertically to the bottom of said lamp house to hold said lamp house, and a screw drive engaging with heads of said plurality of screws, rotating said plurality of screws by the same quantity, and thus moving said lamp house along a vertical axis while keeping it in a horizontal attitude.

3. A light source according to claim 2 wherein said plurality of screws have their heads formed as spur gears, and said screw drive is formed with a drive gear that engages with the spur gears of said plurality of screws and turns with a driving force applied to said optical axis adjustment mechanism to rotate each of said plurality of screws by the same quantity.

4. A light source according to claim 3 wherein said drive gear has a worm surface, and said optical axis adjustment mechanism operation unit has a worm engaging with said worm surface to rotate said drive gear at one end and an adjustment knob at the other end extending beyond the side of said base member.

5. A light source according to claim 4 wherein said plurality of screws have their heads formed as pulleys, and said screw drive is formed with a timing belt laid over the pulleys of said plurality of screws and transmits a driving force originating from said optical axis adjustment mechanism to rotate said plurality of screws by the same quantity.

6. A light source according to claim 5 wherein said timing belt is laid over an operation pulley projecting from the side of said base member and thus forms said optical axis adjustment mechanism.

* * * * *